United States Patent
Tyrell et al.

(10) Patent No.: US 6,673,140 B2
(45) Date of Patent: Jan. 6, 2004

(54) INK-JET INKS AND INK SETS PROVIDING EXCELLENT GAMUT, IMAGE QUALITY, AND PERMANENCE

(75) Inventors: Paul Tyrell, Corvallis, OR (US); Patricia A Wang, Salem, OR (US); Charles G. Dupuy, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 134 days.

(21) Appl. No.: 10/094,911

(22) Filed: Mar. 11, 2002

(65) Prior Publication Data

US 2003/0172839 A1 Sep. 18, 2003

(51) Int. Cl.$^7$ .................... C09D 11/02; C09B 45/32; C09B 45/28
(52) U.S. Cl. ................ 106/31.5; 106/31.52; 534/709; 534/716
(58) Field of Search .............. 106/31.5, 31.52; 534/709, 716

(56) References Cited

U.S. PATENT DOCUMENTS

| | | | | |
|---|---|---|---|---|
| 4,988,805 A | * | 1/1991 | Kunde | 534/717 |
| 5,302,197 A | | 4/1994 | Wickramanayke et al. | 106/31.76 |
| 5,428,383 A | | 6/1995 | Shields et al. | 347/96 |
| 5,534,051 A | | 7/1996 | Lauw | 106/31.49 |
| 5,725,641 A | | 3/1998 | MacLeod | 106/31.5 |
| 5,766,327 A | | 6/1998 | Maze | 106/31.58 |
| 5,788,754 A | | 8/1998 | Deardurff et al. | 106/31.58 |
| 5,851,273 A | | 12/1998 | Morris et al. | 106/31.27 |
| 5,858,075 A | | 1/1999 | Deardurff et al. | 106/31.27 |
| 6,203,604 B1 | * | 3/2001 | Kashiwazaki et al. | 106/31.5 |
| 6,302,949 B1 | * | 10/2001 | Peter | 106/31.52 |
| 6,527,844 B2 | * | 3/2003 | Erdtmann et al. | 106/31.48 |
| 2003/0088077 A1 | * | 5/2003 | Yamada et al. | 534/707 |

FOREIGN PATENT DOCUMENTS

| | | |
|---|---|---|
| EP | 0 982 371 | 3/2000 |
| EP | 1 048 705 | 11/2000 |
| EP | 1 132 441 | 9/2001 |
| WO | WO0148090 | 7/2001 |

OTHER PUBLICATIONS

HP patent application 10015559;filed Oct. 29, 2001 USPTO patent application 10/000,043.
HP Patent Application 100200910, filed Mar. 11, 2002, serial number unassigned.

* cited by examiner

Primary Examiner—Helene Klemanski

(57) ABSTRACT

The present invention is drawn to ink-jet inks that can be used with cyan, magenta, and yellow ink set systems for improved image gamut and lightfastness while maintaining good chroma in the case of color ink and lightness in the case of black ink. More specifically, in an embodiment of the invention, ink sets can comprise specific ink-jet inks having low dye load dyes for use in six-ink systems, for example.

21 Claims, No Drawings

INK-JET INKS AND INK SETS PROVIDING EXCELLENT GAMUT, IMAGE QUALITY, AND PERMANENCE

FIELD OF THE INVENTION

The present invention is drawn to the area of ink-jet imaging. More specifically, the present invention is drawn to ink-jet inks that can be used in conjunction with cyan, magenta, and yellow ink set systems for improved gamut and lightfastness while maintaining good chroma in the case of color ink and lightness in the case of black ink.

BACKGROUND OF THE INVENTION

In recent years, computer printer technology has evolved to a point where very high resolution images can be transferred to various types of media, including paper. One particular type of printing involves the placement of small drops of a fluid ink onto a media surface in response to a digital signal. Typically, the fluid ink is placed or jetted onto the surface without physical contact between the printing device and the surface. Within this general technique, the specific method that the ink-jet ink is deposited onto the printing surface varies from system to system, and can include continuous ink deposit and drop-on-demand ink deposit.

With regard to continuous printing systems, inks used are typically based on solvents such as methyl ethyl ketone and ethanol. Essentially, continuous printing systems function as a stream of ink droplets are ejected and directed by a printer nozzle. The ink droplets are directed additionally with the assistance of an electrostatic charging device in close proximity to the nozzle. If the ink is not used on the desired printing surface, the ink is recycled for later use. With regard to drop-on-demand printing systems, the ink-jet inks are typically based upon water and solvents such as glycols. Essentially, with these systems, ink droplets are propelled from a nozzle by heat or by a pressure wave such that all of the ink droplets ejected are used to form the printed image.

There are several reasons that ink-jet printing has become a popular way of recording images on various media surfaces, particularly paper. Some of these reasons include low printer noise, capability of high-speed recording, and multi-color recording. Additionally, these advantages can be obtained at a relatively low price to consumers. However, though there has been great improvement in ink-jet printing, accompanying this improvement are increased demands by consumers in this area, e.g., higher speeds, higher resolution, full color image formation, increased stability, etc. As new ink-jet inks are developed, there have been several traditional characteristics to consider when evaluating the ink in conjunction with a printing surface or substrate. Such characteristics include edge acuity and optical density of the image on the surface, dry time of the ink on the substrate, adhesion to the substrate, lack of deviation in ink droplet placement, presence of all dots, resistance of the ink after drying to water and other solvents, long term storage stability, and long term reliability without corrosion or nozzle clogging. Though the above list of characteristics provides a worthy goal to achieve, there are difficulties associated with satisfying all of the above characteristics. Often, the inclusion of an ink component meant to satisfy one of the above characteristics can prevent another characteristic from being met. Thus, most commercial inks for use in ink-jet printers represent a compromise in an attempt to achieve at least an adequate response in meeting all of the above listed requirements.

In general, ink-jet inks are either dye- or pigment-based inks. Both are typically prepared in an ink vehicle that contains the dye and/or the pigment. Dye-based ink-jet inks generally use a liquid colorant that is usually water-based to turn the media a specific color. Conversely, pigmented inks typically use a solid or dispersed colorant to achieve color.

Color characteristics of dye-containing inks play an important role in the quality of the printed ink-jet image. Perceived color quality can be characterized using any one of several color space systems, such as CIELAB or Munsell, as is well known in the art. With respect to Munsell color space, a given color is defined using three terms, namely Hue, Value, and Chroma. With respect to CIELAB color space, a color is defined using three terms L*, a*, and b*. With this system, L* defines the lightness of a color, and it ranges from 0 (black) to 100 (white). Additionally, the terms a* and b*, together, define the hue, where a* ranges from a negative number (green) to a positive number (red), and b* ranges from a negative number (blue) to a positive number (yellow). Additional terms such as h° (hue angle) and C* (chroma) are used to further describe a given color, as is known to those skilled in the art.

Inks are known which possess one or more of the above described properties. However, few inks are known that possess all of these properties, since an improvement in one property often results in the degradation in another property. Accordingly, investigations continue into developing ink formulations that have improved properties and that do not improve one property at the expense of the others. However, many challenges still remain to further improve the image quality and lightfastness of ink-jet prints without sacrificing pen performance and reliability.

SUMMARY OF THE INVENTION

It has been recognized that the use of certain ink-jet inks having certain dyes can be used in conjunction with cyan, magenta, and yellow ink set systems for improved image quality. Specifically, a magenta ink for ink-jet printing can comprise an effective amount of an ink vehicle; and an effective amount of a magenta dye having the following chemical structure:

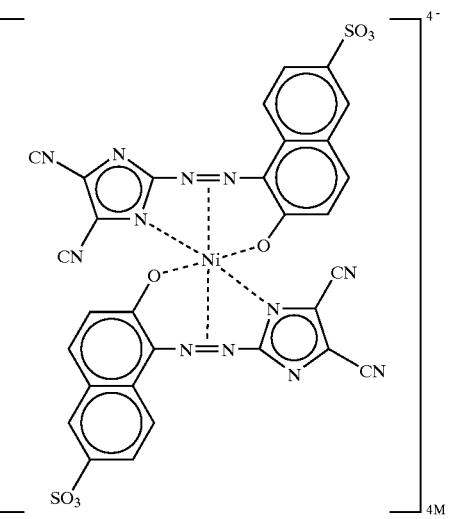

Formula 1 wherein M is H or a monovalent ion, such as Na$^+$, Li$_+$, K$_+$, NH$_4^+$, and combinations thereof.

In another embodiment, a black inkjet ink for use with a color ink set can comprise an effective amount of an ink vehicle; and an effective amount of a black dye having the following chemical structure:

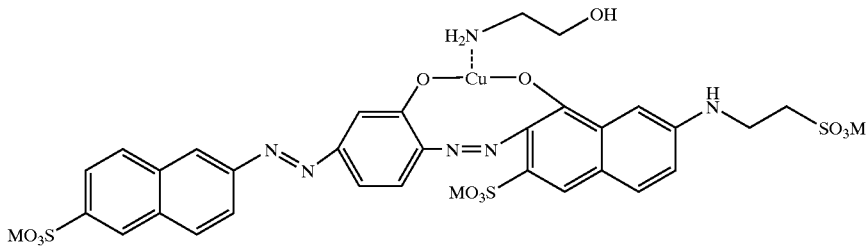

Formula 2 wherein M is H or a monovalent ion, such as $Na^+$, $Li^+$, $K^+$, $NH_4^+$, and combinations thereof.

The ink-jet inks described above can be used as part of an ink set for ink-jet printing. Such an ink set can comprise a three-ink ink set of cyan ink, magenta ink, and yellow ink; and a second magenta ink having a magenta dye load from 0.1% to 7.0% by weight, wherein the magenta dye has the structure of Formula 1. An alternative ink set for ink-jet printing can comprise a three-ink ink set of cyan ink, magenta ink, and yellow ink; and a black ink having a black dye load from 0.1% to 10.0% by weight, wherein the black dye has the structure of Formula 2.

In a more detailed aspect of the present invention, a six-ink ink set for ink-jet printing can comprise 1) a magenta ink-jet ink having a dye load from 2.0% to 7.0% by weight; 2) a second magenta ink-jet ink having a dye load from 0.1% to 2.0% by weight and having the structure set forth in Formula 1, with the proviso that the magenta ink-jet ink and the second magenta ink-jet ink are not the same composition; 3) a black ink-jet ink having a dye load from 0.1% to 10.0% by weight; 4) a cyan ink-jet ink having a dye load from 2.0% to 7.0% by weight; 5) a second cyan ink-jet ink having a dye load from 0.1% to 2.0% by weight, with the proviso that the cyan ink-jet ink and the second cyan ink-jet ink are not the same composition; and 6) a yellow ink-jet ink having a dye load from 2.0% to 10.0% by weight.

In an alternative more detailed embodiment of the present invention, a six-ink ink set for ink-jet printing can comprise 1) a magenta ink-jet ink having a dye load from 2.0% to 7.0% by weight; 2) a second magenta ink-jet ink having a dye load from 0.1% to 2.0% by weight, with the proviso that the magenta ink-jet ink and the second magenta ink-jet ink are not the same composition; 3) a black inkjet ink having a dye load from 0.1% to 10.0% by weight and having the structure set forth in Formula 2; 4) a cyan ink-jet ink having a dye load from 2.0% to 7.0% by weight; 5) a second cyan ink-jet ink having a dye load from 0.1% to 2.0% by weight, with the proviso that the cyan ink-jet ink and the second cyan ink-jet ink are not the same composition; and 6) a yellow ink-jet ink having a dye load from 2.0% to 10.0% by weight.

In still a more detailed aspect of the present invention, a six-ink ink set can be prepared having a three-ink ink set of cyan, magenta, and yellow; a black ink comprising from 2.0% to 7.0% by weight of the dye of Formula 2; a second magenta ink comprising from 0.1% to 2.0% by weight of the dye of Formula 1; and/or a second cyan ink comprising from 0.1% to 2.0% of DB 199.

DETAILED DESCRIPTION OF EMBODIMENTS OF THE INVENTION

Before the present invention is disclosed and described, it is to be understood that this invention is not limited to the particular process steps and materials disclosed herein because such process steps and materials may vary somewhat. It is also to be understood that the terminology used herein is used for the purpose of describing particular embodiments only. The terms are not intended to be limiting because the scope of the present invention is intended to be limited only by the appended claims and equivalents thereof.

It must be noted that, as used in this specification and the appended claims, the singular forms "a," "an," and "the" include plural referents unless the content clearly dictates otherwise.

As used herein, "effective amount" refers to the minimal amount of a substance or agent, which is sufficient to achieve a desire effect. For example, an effective amount of an "ink vehicle" is the minimum amount required in order to create an ink composition, while maintaining properties necessary for effective ink-jetting.

As used herein, "liquid vehicle" or "ink vehicle" refers to the vehicle in which colorant is placed to form an ink. Ink vehicles are well known in the art, and a wide variety of ink vehicles may be used with the systems and methods of the present invention. Such ink vehicles may include a mixture of a variety of different agents, including, surfactants, solvents, co-solvents, buffers, biocides, sequestering agents, viscosity modifiers, surface-active agents, and water, for example.

With this in mind, the present invention is drawn to the area of ink-jet imaging. More specifically, the present invention is drawn to ink-jet inks that can be used in conjunction with cyan, magenta, and yellow ink set systems for providing improved gamut and lightfastness while maintaining good chroma in the case of color ink and lightness in the case of black ink. Particularly, it has been recognized that certain dyes can be used in ink-jet inks that improve the print quality of images. In one embodiment, these dyes can be used in a six-ink ink set system having two cyan inks, two magenta inks, a yellow ink, and a black ink. In another embodiment of the present invention, low dye load magenta ink and/or medium dye load black ink can be used in such a system. In yet another embodiment, the ink sets for printing ink-jet images are disclosed using commercially available ink-jet printers, such as DESKJET™ and other similar printers manufactured by Hewlett-Packard Company. The present inks, particularly when used in six-ink ink sets, can produce true colors on a variety of media, including uncoated media, clay coated media, inorganic porous media, and gelatin coated media, each with improved lightfastness and gamut.

In the practice of the invention, each color of the ink set, namely cyan, yellow, and magenta, can be present in more than one ink, each having more than one dye load, for example. That is, there can be one or more ink-jet pens filled for each ink color, each pen having a different dye load, a different dye, different vehicle components, different amounts of vehicle components, etc. For example, there can be two magenta pens, each one containing a different dye load and/or a different magenta dye.

With this in mind, a magenta ink for ink-jet printing can comprise an effective amount of an ink vehicle; and an effective amount of a magenta dye having the chemical structure of Formula 1 below:

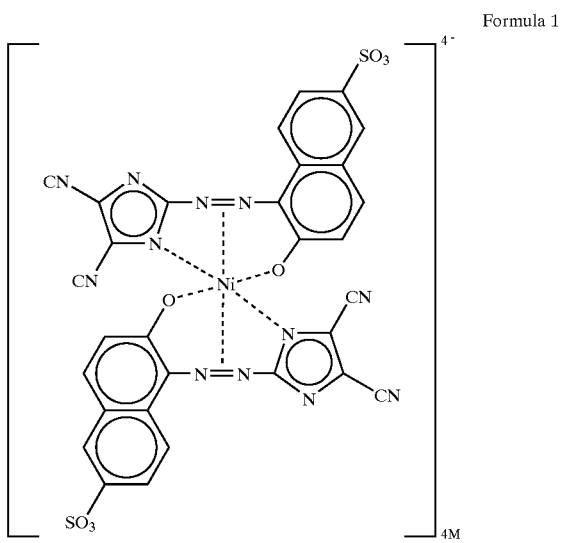

Formula 1 wherein M is H or a monovalent ion, such as Na$^+$, Li$^+$, K$^+$, NH$_4^+$, and combinations thereof.

Though any effective dye load can be used in accordance with an embodiment of the present invention, from 0.1% to 7.0% by weight of the dye of Formula 1 can be included in an ink vehicle to provide an adequate dye load range for many applications. In a lower dye load embodiment, a magenta dye load from 0.1% to 2.0% by weight can be used resulting in good lightfastness, such as is desired for use in six-ink ink set applications. In another embodiment, from 2.0% to 7.0% by weight of the magenta dye of Formula 1 can be used for higher dye load applications. In either embodiment, any ink-vehicle components can be used that are functional with the dye set forth in Formula 1. However, in one embodiment, the ink-vehicle can comprise from 5.0% to 50.0% of at least one solvent by weight, from 0.01% to 10.0% of at least one surfactant by weight, and water. These exemplary ink-vehicle components will be set forth more fully hereinafter.

In an alternative embodiment, a black ink-jet for use with a three or more color ink set can comprise an effective amount of an ink vehicle; and an effective amount of a black dye having the chemical structure of Formula 2:

50.0% by weight of at least one solvent, from 0.01% to 10.0% by weight of at least one surfactant, and water. Other vehicle components can optionally be present as well. These exemplary ink-vehicle components will be set forth more fully hereinafter.

The ink-jet inks set forth herein can be used as part of ink sets that provide images having excellent gamut, image quality, lightfastness, and permanence. In one embodiment, an ink set for ink-jet printing can comprise a three-ink ink set of cyan ink, magenta ink, and yellow ink; and a second magenta ink having a magenta dye load from 0.1% to 2.0% by weight, wherein the magenta dye has the structure of Formula 1 above. In this ink set, a black ink and/or a second cyan ink can be present as well, each having dye loads in functional amounts. If a black ink is present, the black ink can include a dye as is set forth in Formula 2 above, and/or include other black dyes known in the art. If a second cyan ink is present, a low dye load of DB 199 can be used, although other cyan dyes can also be used as well.

In another embodiment, an ink set for ink-jet printing can comprise a three-ink ink set of cyan ink, magenta ink, and yellow ink; and a black ink having a black dye load from 0.1% to 10.0% by weight, and preferably from 2.0% to 7.0% by weight, wherein the black dye has the structure of Formula 2 above. In a more detailed aspect, a second magenta ink and/or a black ink can also be present in this ink set, each having dye loads in functional amounts. The magenta ink can include a low load magenta dye such as that shown in Formula 1 above, though other magenta dyes can be used as well. Again, if a second cyan ink is used, then a low dye load of Direct Blue 199 dye, for example, can be used.

In still a more detailed aspect of the present invention, a six-pen ink set for ink-jet printing can comprise 1) a magenta ink-jet ink having a dye load from 2.0% to 7.0% by weight; 2) a second magenta ink-jet ink having a dye load from 0.1% to 2.0% by weight, and having the structure set forth in Formula 1, with the proviso that the magenta ink-jet ink and the second magenta ink-jet ink are not the same composition; 3) a black ink-jet ink having a dye load from 0.1% to 10.0% by weight; 4) a cyan ink-jet ink having a dye load from 2.0% to 7.0% by weight; 5) a second cyan ink-jet ink having a dye load from 0.1% to 2.0% by weight, with the proviso that the cyan ink-jet ink and the second cyan ink-jet ink are not the same composition; and 6) a yellow ink-jet ink having a dye load from 2.0% to 10.0% by weight.

Formula 2

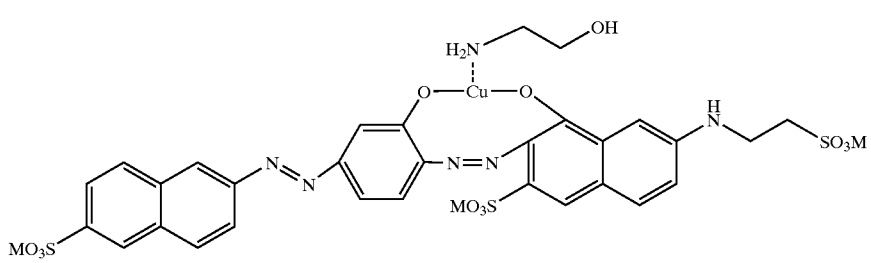

wherein M is H or a monovalent ion, such as Na$^+$, Li$^+$, K$^+$, NH$_4^+$, and combinations thereof.

Again, though any black dye load that is functional is within the scope of this embodiment of the present invention, a black dye load from 0.1% to 10.0% by weight can be used for achieving good printing results. A more preferred range includes dye loads from 2.0% to 7.0% by weight. With respect to black ink-jet inks using these and other dye loads, any ink-vehicle components can be used that are functional with the dye set forth in Formula 2. In one embodiment, the ink-vehicle can comprise from 5.0% to In an alternative more detailed aspect, a six-pen ink set for ink-jet printing can comprise 1) a magenta ink-jet ink having a dye load from 2.0% to 7.0% by weight; 2) a second magenta ink-jet ink having a dye load from 0.1% to 2.0% by weight, with the proviso that the magenta ink-jet ink and the second magenta ink-jet ink are not the same composition; 3) a black ink-jet ink having a dye load from 0.1% to 10.0% by weight, and having the structure set forth in Formula 2; 4) a cyan ink-jet ink having a dye load from 2.0% to 7.0% by weight; 5) a second cyan ink-jet ink having a dye load from 0.1% to 2.0% by weight, with the proviso that the cyan ink-jet ink and the second cyan ink-jet ink are not the same composition; and 6) a yellow ink-jet ink having a dye load from 2.0% to 10.0% by weight.

The above embodiments are merely provided to set forth some examples. Those skilled in the art will appreciate modifications that are also within the scope of the present invention, A typical formulation for an ink useful in the practice of this invention can include a dye, present from 0.1% to 10.0% by weight, one or more solvent or co-solvents, present in total at from 5.0% to 50.0% by weight, and one or more non-ionic, cationic, and/or anionic surfactant, present from 0.01% to 10.0% by weight, for example. The balance of the formulation can be purified water, or other vehicle components known in the art such as biocides, viscosity modifiers, materials for pH adjustment, sequestering agents, preservatives, and the like.

Classes of solvents or co-solvents that can be used can include aliphatic alcohols, aromatic alcohols, diols, glycol ethers, polyglycol ethers, caprolactams, formamides, acetamides, and long chain alcohols. Examples of such compounds include primary aliphatic alcohols, secondary aliphatic alcohols, 1,2-alcohols, 1,3-alcohols, 1,5-alcohols, ethylene glycol alkyl ethers, propylene glycol alkyl ethers, higher homologs of polyethylene glycol alkyl ethers, N-alkyl caprolactams, unsubstituted caprolactams, both substituted and unsubstituted formamides, both substituted and unsubstituted acetamides, and the like. Specific examples of solvents that can be used include trimethylolpropane, 2-pyrrolidinone, and 1,5-pentanediol.

One or more of many surfactants can also be used as are known by those skilled in the art of ink formulation and may be alkyl polyethylene oxides, alkyl phenyl polyethylene oxides, polyethylene oxide block copolymers, acetylenic polyethylene oxides, polyethylene oxide (di)esters, polyethylene oxide amines, protonated polyethylene oxide amines, protonated polyethylene oxide amides, dimethicone copolyols, substituted amine oxides, and the like. The amount of surfactant added to the formulation of this invention may range from 0.01% to 10.0% by weight. A more preferred amount is from 0.15 to 5.0% by weight.

Consistent with the formulation of this invention, various other additives may be employed to optimize the properties of the ink composition for specific applications. Examples of these additives are those added to inhibit the growth of harmful microorganisms. These additives may be biocides, fungicides, and other microbial agents, which are routinely used in ink formulations. Examples of suitable microbial agents include, but are not limited to, Nuosept (Nudex, Inc.), Ucarcide (Union carbide Corp.), Vancide (R. T. Vanderbilt Co.), Proxel (ICI America), and combinations thereof.

Sequestering agents such as EDTA (ethylene diamine tetra acetic acid) may be included to eliminate the deleterious effects of heavy metal impurities, and buffer solutions may be used to control the pH of the ink. From 0.001% to 2.0% by weight, for example, can be used. Viscosity modifiers and buffers may also be present, as well as other additives known to those skilled in the art to modify properties of the ink as desired. Such additives can be present at from 0.01% to 20% by weight.

EXAMPLES

The following examples illustrate the embodiments of the invention that are presently best known. However, it is to be understood that the following are only exemplary or illustrative of the application of the principles of the present invention. Numerous modifications and alternative compositions, methods, and systems may be devised by those skilled in the art without departing from the spirit and scope of the present invention. The appended claims are intended to cover such modifications and arrangements.

Thus, while the present invention has been described above with particularity, the following Examples provide further detail in connection with what are presently deemed to be the most practical and preferred embodiments of the invention.

Example 1
Preparation of Six-Ink Ink Set in Accordance with an Embodiment of the Present Invention Three ink-jet inks were prepared in accordance with Tables 1–3 as follows:

TABLE 1

Magenta ink-jet ink

| INGREDIENT | Wt % |
| --- | --- |
| trimethylolpropane | 12.0% |
| 2-pyrrolidinone | 6.5% |
| 1,5-pentanediol | 2.0% |
| nonionic surfactant | 2.0% |
| anionic surfactant | 0.6% |
| Buffer | 0.2% |
| EDTA | 0.0075% |
| Formula 1 dye | 0.7% |
| Water | balance |

TABLE 2

Black ink-jet ink

| INGREDIENT | Wt % |
| --- | --- |
| trimethylolpropane | 12.0% |
| 2-pyrrolidinone | 6.5% |
| 1,5-pentanediol | 2.0% |
| nonionic surfactant | 2.0% |
| anionic surfactant | 0.6% |
| Buffer | 0.2% |
| EDTA | 0.0075% |
| Formula 2 dye | 3.8% |
| Water | balance |

TABLE 3

Cyan ink-jet ink

| INGREDIENT | Wt % |
| --- | --- |
| trimethylolpropane | 12.0% |
| 2-pyrrolidinone | 6.5% |
| 1,5-pentanediol | 2.0% |
| nonionic surfactant | 2.0% |
| anionic surfactant | 0.6% |
| Buffer | 0.2% |
| EDTA | 0.0075% |
| DB 199 dye | 1.2% |
| Water | balance |

These three low to medium dye load ink-jet inks provided in Tables 1–3 above can be used with many higher dye load ink sets, but have been shown to be particularly useful when used in conjunction with the high dye load ink set identified by Hewlett-Packard part number HP C6657A. For example, if all three ink-jet inks of Tables 1–3 are used with the three inks of the HP C6657A ink set, a six-ink ink set can be arranged, i.e., high dye load yellow ink from HP C6657A, high dye load magenta ink from HP C6657A, high dye load cyan ink from HP C6657A, medium dye load black ink having Formula 2 dye, low dye load cyan ink having DB 199 dye, and low dye load magenta ink having Formula 1 dye. This six-ink ink set arrangement is exemplary, and should not be considered limiting, but provides good lightfastness, hue, chroma, lightness, and gamut volume, as illustrated in Examples 3 and 4 below.

Example 2

Preparation of Comparison Six-Ink Ink Set

For comparison purposes, a six-ink ink set was prepared comprising three high dye load inks, i.e., cyan, yellow, and magenta from HP C6657A, as well as three additional inks, i.e., cyan (1.2% DB 199 dye by weight), black (4.6% pacified Reactive Black 31 dye by weight), and magenta (1.4% Magenta 377 dye by weight). Though the dye load weight percentages for the magenta and black inks from Example 1 and Example 2 were different, the dye load as measured by absorbance was the same. The ink set of the present example provides a state of the art six-ink ink set to be compared with an ink set prepared in accordance with an embodiment of the present invention as described in Example 1.

Example 3

Chroma, Lightness, Hue Angle, and Lightfastness Comparison of Example 1 Ink Set and Example 2 Ink Set In the present example, print samples using the ink sets of Example 1 and Example 2 were generated using a Hewlett-Packard DeskJet 5550C on Hewlett-Packard Colorfast Paper (C7013A) and Hewlett-Packard Premium Plus Photo Paper (C6831A). Specifically, squares having an optical density of 1.0 OD were printed using each of the ink sets described in Example 1 and Example 2. Chroma C* (or Lightness L* in the case of Black), hue angle, and lightfastness data was sought for each printed sample. All lightfastness data was obtained using the Wilhelm Imaging Research Inc. failure criteria. To effectuate lightfade, print samples were exposed to ca. 70 kLux light using an Atlas HPUV Actinic exposure System (Atlas Electric Devices Co., Chicago, Ill.). The optical density of the printed samples were measured periodically. Percent optical density loss from a square with an initial optical density equal to 1.0 OD was used to characterize lightfastness. Data was extrapolated and reported as years to failure to the Wilhelm Imaging Research Inc. endpoint criteria. A year was assumed to be 450 lux/12 hour day, considered typical for indoor office light exposure.

As the present invention provides new magenta and black ink-jet inks for use in such a system, only the magenta inks and the black inks were compared, as described in Table 4 and Table 5 below:

TABLE 4

| Ink set and Color Printed | Chroma (C*) | Hue Angle (h°) | Lightfastness (yrs) |
|---|---|---|---|
| Example 1 Magenta Square | 69 | 341 | 37 |
| Example 2 Magenta Square | 65 | 345 | 12 |

TABLE 5

| Ink set and Color Printed | Lightness (L*) | Lightfastness (yrs) |
|---|---|---|
| Example 1 Black | 37 | >40 |
| Example 2 Black | 38 | 27 |

From the above data, it is clear that the magenta and black printed squares of the Example 1 ink set exhibited comparable color properties to the Example 2 ink set printed magenta and black squares. However, the lightfastness of the magenta and black squares printed using the Example 1 ink set was much greater than the lightfastness of the printed squares of the Example 2 ink set.

Example 4

Color Gamut Comparison of Example 1 Ink Set and Example 2 Ink Set

Color gamut was measured by printing color ramps and palettes using the ink set of Example 1 and Example 2, each on two different print mediums, i.e., HP Colorfast Paper and HP Premium Plus Photo Paper, glossy. The color ramps and palettes comprised squares of varying ink set combinations and increasing ink density, each 300 dots per inch (dpi) pixel receiving from 0 to about 150 pL of ink. Optical density (OD), L*, a*, and b* of the printed images were measured using a Gretag Macbeth Spectroscan colorimeter using standard color measurement procedures. Gamut volume was calculated by estimating the volume in L*a*b* space encompassed by a palette of representative colors. The ink set of Example 1 was compared with the ink set of Example 2 for gamut in Table 6 below:

TABLE 6

| Ink set | Gamut Volume on on HP Colorfast Paper (kL*a*b* units) | Gamut Volume on HP Premium Glossy Photo Paper (kL*a*b* units) |
|---|---|---|
| Example 1 | 404 | 543 |
| Example 2 | 394 | 525 |

As illustrated by Table 6 above, the ink set of Example 1 provided printed samples that exhibited better gamut than the samples printed by the ink set of Example 2.

While the invention has been described with reference to certain preferred embodiments, those skilled in the art will appreciate that various modifications, changes, omissions, and substitutions can be made without departing from the spirit of the invention. For example, though a specific vehicle is shown for use in Example 1, other vehicles can also be used. Additionally, other combinations of ink sets that utilize the dye(s) of Formula 1 and/or Formula 2 can also be used with success. It is intended, therefore, that the invention be limited only by the scope of the following claims.

What is claimed is:

1. A magenta ink for ink-jet printing, comprising: an ink vehicle; and a magenta dye having the chemical structure

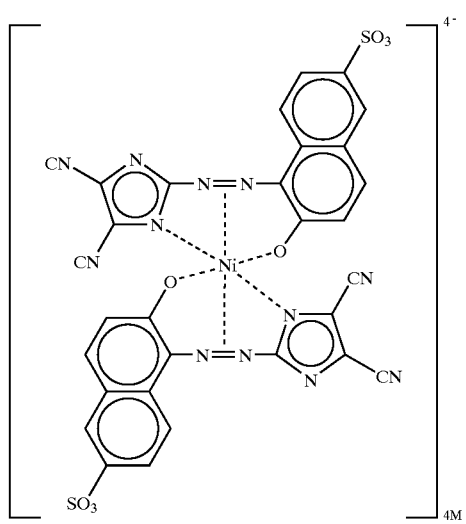

wherein each M is independently H or a monovalent ion.

2. A magenta ink as in claim 1, wherein M is selected from the group consisting of H, $Na^+$, $Li^+$, $K^+$, $NH_4^+$, and combinations thereof.

3. A magenta ink as in claim 1, having a magenta dye load from 0.1% to 7.0% by weight.

4. A magenta ink as in claim 3, having a magenta dye load from 0.1% to 2.0% by weight, said magenta ink being configured for use in a multiple-ink ink set system as a second magenta ink.

5. A magenta ink as in claim 3, having a magenta dye load from 2.0% to 7.0% by weight.

6. An ink set for ink-jet printing, comprising:

a three-ink ink set of cyan ink, magenta ink, and yellow ink; and a second magenta ink having a magenta dye load from 0.1% to 7.0% by weight, said magenta dye having the structure

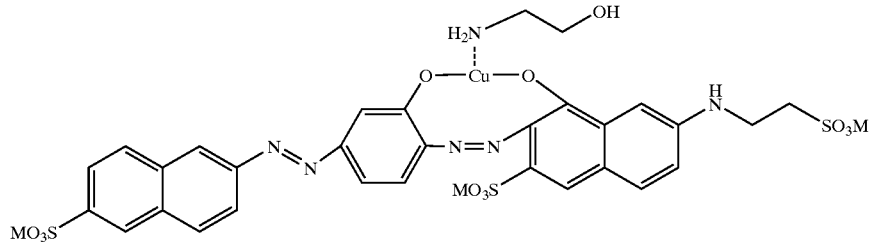

wherein each M is independently H or a monovalent ion.

7. An ink set as in claim 6, wherein the magenta dye load is from 0.1% to 2.0% by weight, and M is selected from the group consisting of H, $Na^+$, $Li^+$, $K^+$, $NH_4^+$, and combinations thereof.

8. An ink set as in claim 6, further comprising a black ink.

9. An ink set as in claim 8, wherein the black ink has a black dye load from 0.1% to 10.0% by weight, said black dye having the structure

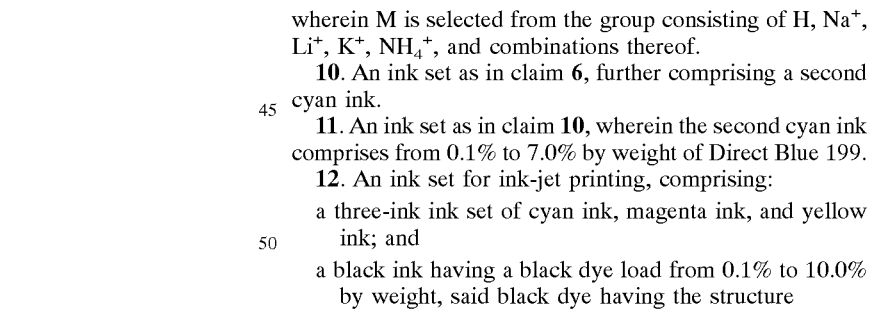

wherein M is selected from the group consisting of H, $Na^+$, $Li^+$, $K^+$, $NH_4^+$, and combinations thereof.

10. An ink set as in claim 6, further comprising a second cyan ink.

11. An ink set as in claim 10, wherein the second cyan ink comprises from 0.1% to 7.0% by weight of Direct Blue 199.

12. An ink set for ink-jet printing, comprising:

a three-ink ink set of cyan ink, magenta ink, and yellow ink; and a black ink having a black dye load from 0.1% to 10.0% by weight, said black dye having the structure

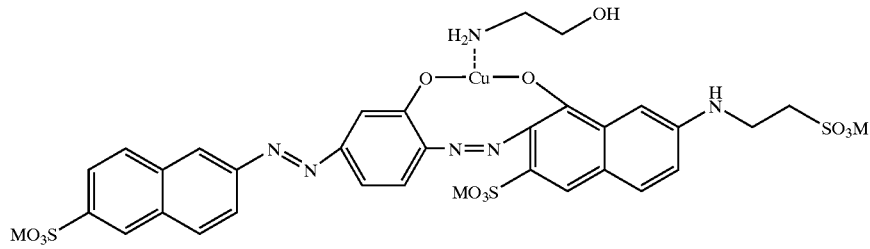

wherein each M is independently H or a monovalent ion.

13. An ink set as in claim 12, wherein the black dye load is from 2.0% to 7.0% by weight, and M is selected from the group consisting of $H^+$, $Na^+$, $Li^+$, $K^+$, $NH_4^+$, and combinations thereof.

14. An ink set as in claim 12, further comprising a second magenta ink.

15. An ink set as in claim 14, wherein the second magenta ink has a magenta dye load from 0.1% to 7.0% by weight, said magenta dye having the structure

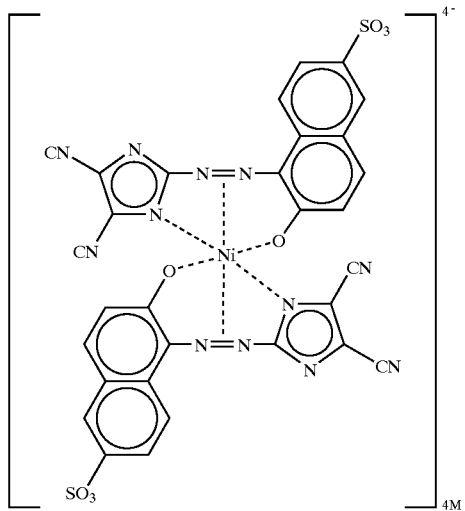

wherein M is selected from the group consisting of H, $Na^+$, $Li^+$, $K^+$, $NH_4^+$, and combinations thereof.

16. An ink set as in claim 12, further comprising a second cyan ink.

17. An ink set as in claim 16, wherein the second cyan ink comprises from 0.1% to 7.0% by weight of Direct Blue 199.

18. A six-pen ink set for ink-jet printing, comprising:
   a magenta ink-jet ink having a dye load from 2.0% to 7.0% by weight;
   a second magenta ink-jet ink having a dye load from 0.1% to 2.0% by weight, and having the structure

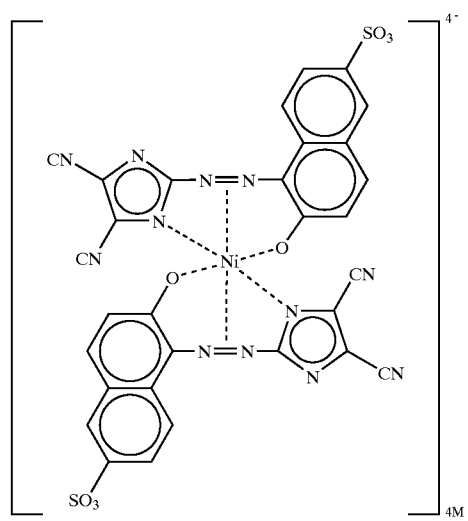

wherein M is a member selected from the group consisting of $H^+$, $Na^+$, $Li^+$, $K^+$, $NH_4^+$, and combinations thereof, with the proviso that the magenta ink-jet ink and the second magenta ink-jet ink are not the same composition;
   a black ink-jet ink having a dye load from 0.1% to 10.0% by weight;
   a cyan ink-jet ink having a dye load from 2.0% to 7.0% by weight;
   a second cyan ink-jet ink having a dye load from 0.1% to 2.0% by weight, with the proviso that the cyan ink-jet ink and the second cyan ink-jet ink are not the same composition; and
   a yellow ink-jet ink having a dye load from 2.0% to 10.00% by weight.

19. A six-pen ink set for ink-jet printing as in claim 18, wherein the black ink-jet ink comprises a dye having the structure

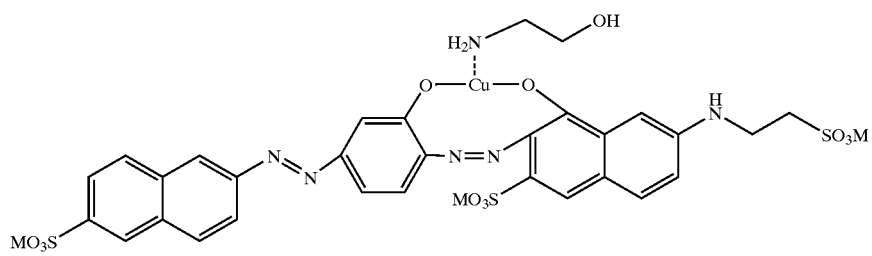

wherein each M is independently H or a monovalent ion; and wherein the second cyan ink-jet ink comprises DB 199 dye.

20. A six-pen ink set for ink-jet printing, comprising:
   a magenta ink-jet ink having a dye load from 2.0% to 7.0% by weight;
   a second magenta ink-jet ink having a dye load from 0.1% to 2.0% by weight, with the proviso that the magenta ink-jet ink and the second magenta ink-jet ink are not the same composition;
   a black ink-jet ink having a dye load from 0.1% to 10.0% by weight, and having the structure

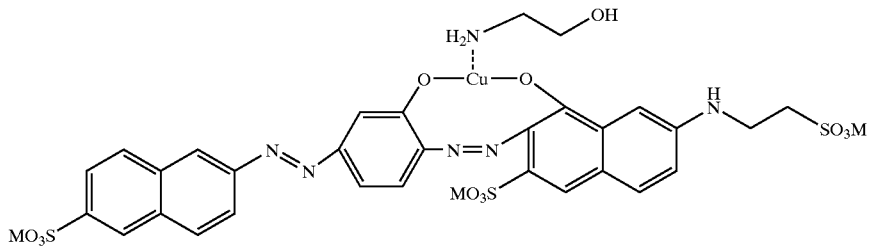

wherein M is a member selected from the group consisting of $H^{30}$, $Na^+$, $Li^+$, $K^+$, $NH_4^+$, and combinations thereof;

a cyan ink-jet ink having a dye load from 2.0% to 7.0% by weight;

a second cyan ink-jet ink having a dye load from 0.1% to 2.0% by weight, with the proviso that the cyan ink-jet ink and the second cyan ink-jet ink are not the same composition; and a yellow ink-let ink having a dye load from 2.0% to 10.0% by weight.

21. A six-pen ink set for ink-jet printing as in claim 20, wherein the second magenta ink-jet ink comprises a dye having the structure

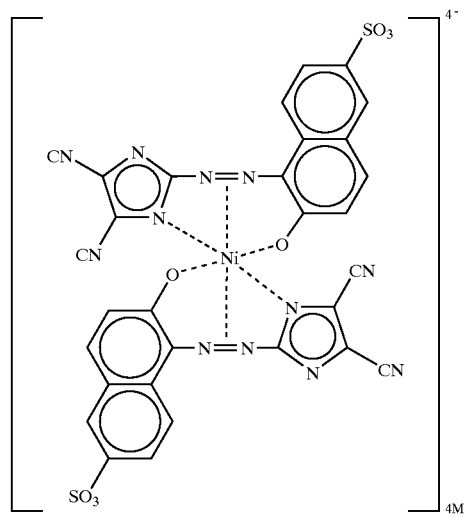

wherein each M is independently H or a monovalent ion; and wherein the second cyan ink-jet ink comprises DB 199 dye.

* * * * *

UNITED STATES PATENT AND TRADEMARK OFFICE
CERTIFICATE OF CORRECTION

PATENT NO. : 6,673,140 B2
DATED : January 6, 2004
INVENTOR(S) : Tyrell et al.

It is certified that error appears in the above-identified patent and that said Letters Patent is hereby corrected as shown below:

Columns 3 and 4,
Replace Formula 2 (at the top of the Columns) with the following formula:

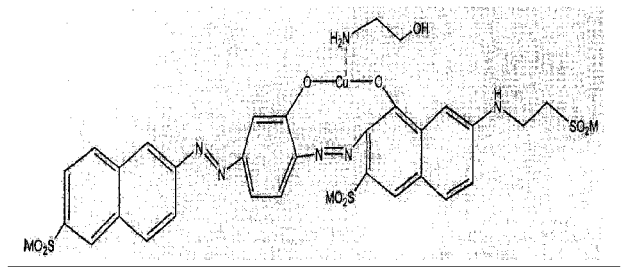

Columns 5 and 6,
Replace Formula 2 (near the bottom of the Columns) with the following formula:

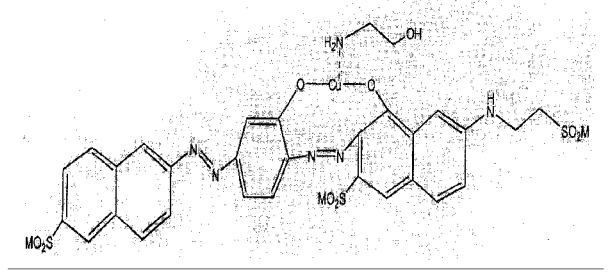

Column 12,
Replace the formula with the following formula:

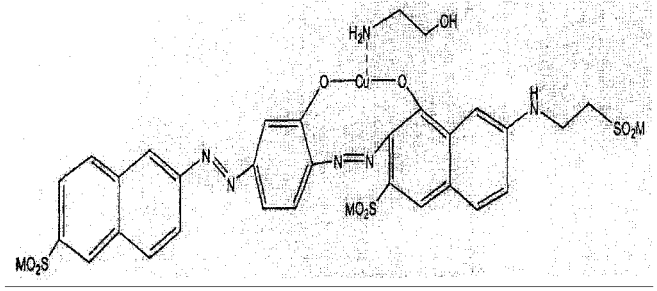

UNITED STATES PATENT AND TRADEMARK OFFICE
CERTIFICATE OF CORRECTION

PATENT NO. : 6,673,140 B2
DATED : January 6, 2004
INVENTOR(S) : Tyrell et al.

It is certified that error appears in the above-identified patent and that said Letters Patent is hereby corrected as shown below:

Column 12,
Replace the formula with the following formula:

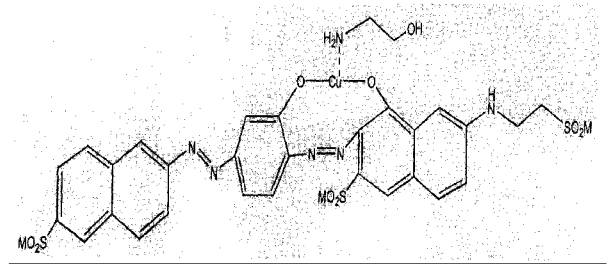

Column 14,
Replace the formula with the following formula:

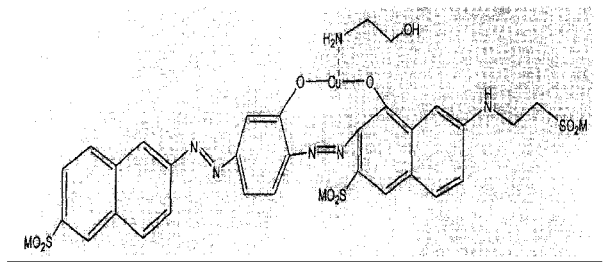

Columns 15 and 16,
Replace the formula (at the top of the Columns) with the following formula:

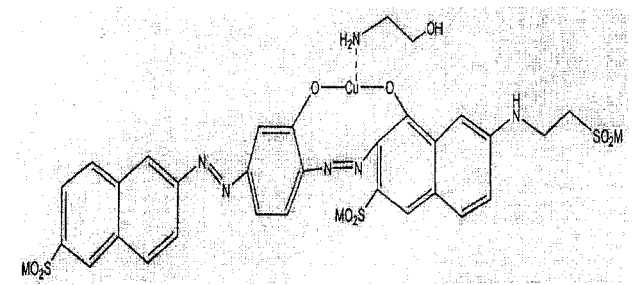

UNITED STATES PATENT AND TRADEMARK OFFICE
CERTIFICATE OF CORRECTION

PATENT NO. : 6,673,140 B2
DATED : January 6, 2004
INVENTOR(S) : Tyrell et al.

It is certified that error appears in the above-identified patent and that said Letters Patent is hereby corrected as shown below:

Column 15,
Line 18, delete "$H^{30}$," and insert therefor -- $H^+$, --.

Signed and Sealed this

Tenth Day of August, 2004

JON W. DUDAS
*Acting Director of the United States Patent and Trademark Office*